United States Patent [19]

Babsch

[11] 4,430,682
[45] Feb. 7, 1984

[54] PROTECTION CIRCUIT FOR D.C. MOTORS

[75] Inventor: Alfred Babsch, Ulm-Söflingen, Fed. Rep. of Germany

[73] Assignee: Mannesmann AG, Duesseldorf, Fed. Rep. of Germany

[21] Appl. No.: 316,894

[22] Filed: Oct. 30, 1981

[30] Foreign Application Priority Data

Nov. 3, 1980 [DE] Fed. Rep. of Germany ....... 3042138

[51] Int. Cl.³ .......................................... H02H 7/085
[52] U.S. Cl. ..................................... 361/31; 361/75; 361/101
[58] Field of Search ...................... 361/31, 75, 98, 100, 361/101; 318/476

[56] References Cited

U.S. PATENT DOCUMENTS 4,019,096 4/1977 Bullinga .......................... 361/75 X
4,363,068 12/1982 Burns .............................. 361/100 X Primary Examiner—Harry E. Moose, Jr.

[57] ABSTRACT

A d.c. motor, particularly a paper-feed drive motor for printers, is monitored and controlled (e.g., for protection against paper jamming) by controlling a motor switch to turn the motor off temporarily when excess current is monitored, but turning it on to probe persistence of the condition. This turn-on will remain short if, indeed, overload current conditions are still present. The circuit includes a bistable multivibrator with input circuit rendering it monostable for normal operating conditions and astable for the overload case.

4 Claims, 1 Drawing Figure

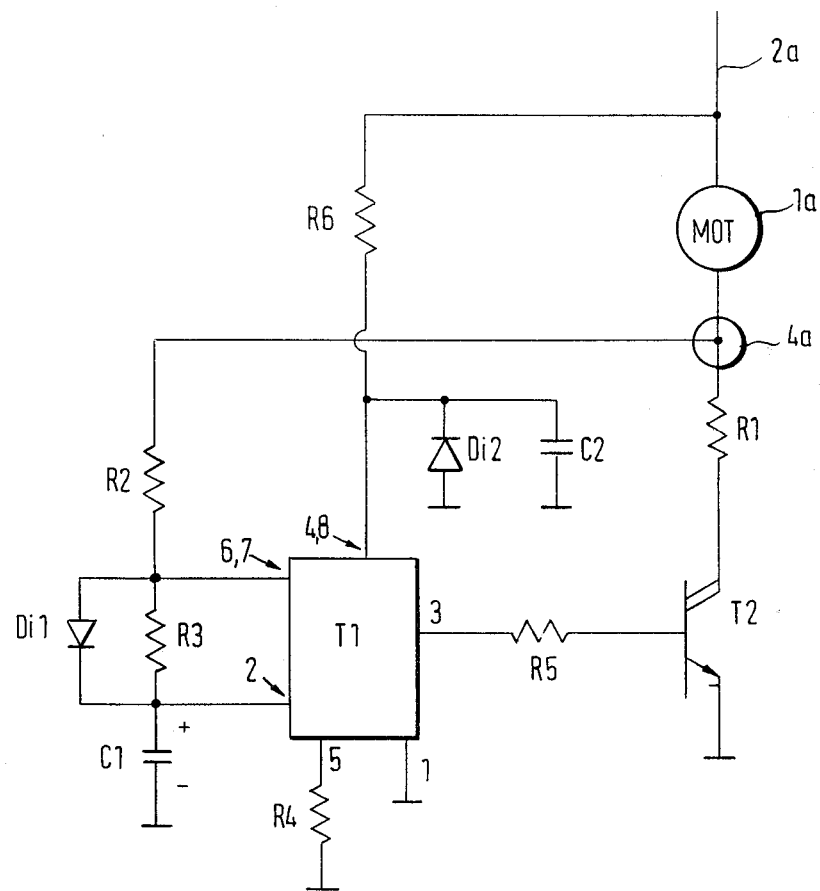

PROTECTION CIRCUIT FOR D.C. MOTORS

BACKGROUND OF THE INVENTION

The present invention relates to the protection of d.c. motors, particularly against undue current increases in the case of excessive load (torque) requirements for, e.g., a reeling or paper feed motor in printers.

A protection of the type referred to above is needed in those cases in which the motor may experience an unexpected overload so as to prevent damage to the motor. Printer motors may experience an excessive load, for example in the case of paper jamming. The usual remedy here is of a mechanical nature such as a slip clutch which decouples the motor from the paper feed drum in the case the drum is blocked. Such clutches or couplings respond to a particular torque and decouple (slip) regardless of the cause. In lieu of a mechanical clutch magnetic couplings have been used. However, these couplings are disadvantaged by the fact that in the case of an overload no torque is transmitted, and full engagement is present even if the load has ceased to turn.

It has been proposed to use a.c. synchronous motors for a reeling and feed operation in printers. However, this type of motor yields only a very low torque when operated (as is usual in printers) in a stepping mode. For this reason, d.c. motors are clearly preferred because even when operated as a stepping motor the developed torque is high.

German printed patent application 25 17 766 (IPC B 41 J 29/54) proposes an electrical protective circuit for matrix printers, for monitoring a single function. In order to recognize any interference sufficiently fast, a resettable timer is associated with the device or element to be monitored, and the timer is triggered anew with each initialization of this device or element. The timer meters a period in excess of the regular operation time of that device or element and will, thus, respond when the repeat operation of the device or element does not recur within that period. This approach is not adequate for monitoring a motor as the current increase in the latter is, in the case of jamming, faster than a metered regular operation of e.g. the paper feeder. In essence, this approach is not applicable in those cases in which two or more mechanical operations are linked, and the disturbance may arise in the first one, blocking the succeeding one or ones, but its or their function is covered by time-metering.

DESCRIPTION OF THE INVENTION

It is an object of the present invention to provide a new and improved circuit for the protection of d.c. motors which causes the motor to be turned off in the case of an excessively high torque demand.

It is a feature of the present invention to incorporate such a protection circuit in the motor control circuit so that it automatically monitors persistence or cessation of conditions of an excessively high torque demand.

In accordance with the preferred embodiment of the present invention, it is suggested to provide a signal that represents the motor current and to provide a circuit with a two-level input such that the circuit provides a turn-off signal when the motor current signal represents an excessively high motor current and to provide a turn-on signal when that current-representing signal drops below the lower threshold, but to apply the motor-current-representing signal to that circuit at specified delays such that the period of turn-on is considerably shorter (e.g., 10%) than the period of turn-off; the turn-on and turn-off signals are applied to a motor switch.

The alternating operation resembles an asymmetric multivibrator or it can be described as a periodic motor turn-on and turn-off switching operation with asymmetric (artificial) hysteresis; but this operation continues in the periodic mode only as long as the tendency to develop an excessively high motor current persists. Inherently, whenever such a tendency does not persist, the circuit will turn the motor on when it is off (as the load current is necessarily zero in this case). Whenever, particularly after such a turn-on, normal operations are maintained, the protective circuit will not turn the motor off. That will occur only if the motor current rises excessively; and under such conditions a short turn-on period after a long turn-off period is used to probe the motor circuit whether or not in the case of a turn-on the current will rise again to excessively high values; if so, it is turned off again. This probing is continued periodically until the cause for excessive torque demands is removed, whereupon the probing period of motor turn-on is simply extended as the excessive current condition will then not be established so that a turn-off signal does not develop.

The control circuit may include a tap or the like developing a signal (such as a voltage) that represents the motor current. That signal is applied via an RC circuit to a first input of a bistable device. A second RC circuit removes, in effect, that signal as a turn-off signal and generates therefrom a delayed turn-on signal in order to obtain the above-mentioned alternation.

The circuit can also be described as being basically a monostable multivibrator rendered astable operationally by means of an RC circuit and in dependence upon the motor-torque-representing signal.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

The FIGURE is a circuit diagram of the protective circuit for a printer motor and constructed in accordance with the preferred embodiment of the invention for practicing the best mode thereof.

A d.c. motor MOT 1a is connected with one end to a line 2a having operating potential; the other motor terminal is connected to a line running via a test point or tap 4a, a resistor R1, a control and power transistor T2 to ground. The resistor R1 is actually provided as a measuring resistor. Transistor T2 is of the NPN variety. Actually, the single transistor T2 should be replaced by a Darlington circuit. A bistable multivibrator T1 has an output terminal 3 connected to the base of transistor T2 via a current-limiting resistor R5. The input circuit for this multivibrator is constructed to render it monostable or astable, depending upon signal levels applied to its inputs.

The purpose of the invention is to avoid undue heating of the copper conductors in motor MOT 1a in order to prevent damage to the insulation jacket around these copper wires. This, of course, is required in order to avoid premature motor breakdown.

The bistable multivibrator T1 has several other terminals: terminal 1 being connected directly to ground, terminal 5 being connected to ground via a Resistor R4. This way, the response level of a first input, 6, is raised. The signal as applied to input terminal 6 causes the multivibrator to shift its output level at terminal 3 to "low," which means that transistor T2 is caused to block current flow in line 1a and, therefore, the motor is turned off. Thus, a low output of T1 is a turn-off signal for the transistor switch T2 and the motor. The multivibrator T1 has a second input, terminal 2, which, upon receiving a declining signal flank, low potential, causes the multivibrator to change its state such that the signal level in terminal 3 goes "high" and transistor switch T2 is rendered conductive; this then is the turn-on situation for the motor and its switch.

It should, thus, be realized that the device T1 is a bistable multivibrator which is modified in two ways: first, the two inputs respond to different signal levels for effecting a switching operation; second, one input is, in effect, constructed as an inverting input because a signal at terminal 2 is effective as a switching signal when the respective signal level drops below a first threshold, while a signal at terminal 6 in order to be effective as a multivibrator-switching signal must rise above a second (higher) threshold. The differences in threshold levels introduce an artificial hysteresis into the circuit; the effect thereof will be described below.

The two input terminals 2 and 6 of device T1 are interconnected by a resistor R3 which is bridged by a diode Di1. Input terminal 2 is additionally connected to one side of a capacitor C1 whose other side is connected to ground. Terminal 6 is connected to the measuring point or a tap 4a in the motor drive circuit, there being a resistor R2 connected in between. This latter branch monitors the voltage drop produced by the motor current accross motor current sensing resistor R1.

The resistors R2 and R3 in cooperation with the capacitor C1 render the bistable device T1 astable or monostable under certain, different operating conditions. In effect, these three elements establish two RC circuits being effective respectively at the two terminals 2 and 6. The device T1 is supplied with power from line 2a via a resistor R6. However, a capacitor C2 and a Zener diode Di2 stabilize the supply voltage to keep transients in line 2a away from the input for device T1.

When idling, motor MOT needs very little current and in particular that current is considerably below a value that is reasonably regarded as an upper limit beyond which one considers the current as being an overload. Thus, when the motor idles, the voltage at point 4a is little above ground. The capacitor C1 carries thus only a small charge, and the input for terminal 2 is such that a previously established motor-turn-on state (3 high) is not disturbed. Particularly, as long as the motor idles (which it does in between two paper feeding steps) voltage at tap 4a is below $\frac{1}{3}$rd of the supply voltage. This, in turn, is sufficient to cause terminal 2 to switch the multivibrator to a "high" output at terminal 3, transistor switch T2 is condutive and the motor runs. The voltage at 6 is the same, but the threshold has been adjusted so that the multivibrator is not shifted to a "low" output at 3.

Overload can be deemed to exist when, for instance, the voltage drop across resistor R1 has a particular ratio to the supply voltage, e.g. a $\frac{2}{3}$rd thereof. The potential at terminal 6 has risen to above the level causing device T1 to change state and to establish the motor turnoff state (3 low). Thus, transistor switch T2 is rendered nonconductive, turning the motor off. Considering this aspect in greater detail, in the case of an increase in current flow through the motor MOT, the voltage at tap 4a may rise above a $\frac{2}{3}$rd of the supply voltage, the voltage at 6 will delayedly follow that rise due to the RC circuit R2-C1 and will turn the multivibrator off. The output at 3 is now low so that the transistor T2 is nonconductive, current does not flow through the motor. This, however, is not a stable state of operation. Internally, device T1 places a terminal 7 (being connected directly to 6) to ground whenever the multivibrator has its output 3 at the low level. With terminals 6 and 7 being grounded, capacitor C1 discharges at a rate determined by the RC constant of circuit R3, C1. This time constant is approximately ten times as long as the time metered by the RC circuit R2/C1. Thus, after a certain, relatively long period of time, the potential at terminal 2 drops below its response value ($\frac{1}{3}$rd of the power supply voltage), whereupon multivibrator T1 is turned on. Output 3 goes high and transistor T2 is turned on. Now, the motor current is turned on again, but if the disturbance persists, the current will rise so that the potential at point 4a goes above the $\frac{2}{3}$rd supply voltage level. The resulting, relatively fast charge of capacitor C1 causes the voltage at terminal 6 to rise above the response threshold, whereupon the multivibrator is turned off again, output 3 goes down.

It can, thus, be seen that the circuit is designed to keep the motor off for a certain period of time, but to test periodically whether the interference still persists. If and whenever not, normal operation is automatically resumed. This mode of operation can be described as that of an astable multivibrator with asymmetric duration of its two states, the asymmetry resulting from the fact that capacitor C1 and resistors R2 and R3 establish different RC circuits with differently long time constants.

In the beginning (at startup), capacitor C is discharged. As soon as supply voltage is applied to the multivibrator, the voltage at terminal 2 is low so that the output put 3 of T1 goes high, turning on the transistor T2 and the motor will start up. The startup requires a rather high current, but even a temporarily peak that shifts the voltage at point 4a to a level above $\frac{2}{3}$ supply voltage, will not turn the motor off because the RC circuit R2-C1 delays the development of a turn-off voltage at terminal 6 and averages the signal level during the start-up period. Since this excess peak is quite short, normal motor operation has been established while the voltage at point 4a is well below the said $\frac{2}{3}$rd level, and the potential at terminal 6 remains below the response threshold. The time constant of R2-C1 must be selected to cover that brief start-up period.

The motor will now continue to run because no turn-off signal is generated. Thus, the device T1 is now operated as a monostable device, the stable state being the turn-on state for the motor. Even if the motor current is such that the signal level tapped at point 4a is between the $\frac{1}{3}$rd and $\frac{2}{3}$rd supply voltage level, no change occurs in the motor control circuit because of the built-in hysteresis for device T1. The astable state for that device requires the measured voltage to rise above the $\frac{2}{3}$rd supply level; and as long as the tendency to develop that excess level persists, the device is astable as to both states.

It should be realized that the function of device T1 and of its input circuit can be duplicated by other means using, e.g., window discriminators or Schmitt triggers.

The invention is not limited to the embodiments described above; but all changes and modifications thereof, not constituting departures from the spirit and scope of the invention, are intended to be included.

I claim:

1. A protective circuit for a d.c. motor driving a load that may experience excessive increases, such as paper jamming in a paper feeder driven by the motor, comprising:

first circuit means connected to the motor for monitoring current flow therethrough and providing a signal representative thereof;

transistor-switching means connected in series with the motor for controlling the current flow through the motor;

a second circuit means including a bistable multivibrator and RC circuit means connected to inputs of the bistable multivibrator to render the multivibrator monostable and astable, depending upon a signal level applied to the inputs, the multivibrator connected to the transistor-switching means for operating the same; and the first circuit means connected to inputs providing thereto said first signal operating said multivibrator as a monostable multivibrator in response to said first signal in a first range for causing the transistor-switching means to turn the motor on intermittently whenever the multivibrator is in the astable state pursuent to its operation as an astable device and operating the multivibrator as a monostable multivibrator in response to said first signal in a second range.

2. A circuit as in claim 1, and constructed so that the astable states have different durations.

3. A circuit as in claim 1, said bistable multivibrator having two input terminals responding to different signal levels and being interconnected by a resistor, one of the input terminals being connected to a capacitor, the other one being resistively connected to the first circuit means, the multivibrator constructed to ground, the other input terminal when in the turn-on state for the switching means.

4. A circuit as in claim 1, the RC circuit means including a charge circuit responding to the signal and a discharge circuit for the charge circuit responding to a state of the multivibrator corresponding to the turn-on state for switching means.

* * * * *